United States Patent [19]

Parker

[11] Patent Number: 5,396,918
[45] Date of Patent: Mar. 14, 1995

[54] WATER PRESSURE REGULATOR AND METHOD FOR REGULATING PRESSURE THROUGH A VALVE

[75] Inventor: Leland L. Parker, Corona, Calif.

[73] Assignee: Agricultural Products, Inc., Ontario, Calif.

[21] Appl. No.: 154,140

[22] Filed: Nov. 18, 1993

[51] Int. Cl.⁶ ............................................. G05D 16/02
[52] U.S. Cl. ................................ 137/14; 137/505.25; 137/508; 138/45
[58] Field of Search ..................... 137/505.25, 508, 14; 138/43, 45, 56

[56] References Cited

U.S. PATENT DOCUMENTS

| | | | |
|---|---|---|---|
| 3,367,360 | 2/1968 | Hickerson | 137/505.25 X |
| 3,431,944 | 3/1969 | Sakuma | 138/43 X |
| 3,890,999 | 6/1975 | Moskow | 137/505.25 |
| 3,926,211 | 12/1975 | MacLarty | 137/505.25 X |
| 4,437,493 | 3/1984 | Okuda et al. | 138/45 |
| 4,543,985 | 10/1985 | Healy et al. | 137/505.25 |
| 5,257,646 | 11/1993 | Meyer | 137/505.25 |

*Primary Examiner*—Stephen M. Hepperle
*Attorney, Agent, or Firm*—Daniel L. Dawes

[57] ABSTRACT

An improved high volume, straight through, low turbulent flow pressure regulating valve is provided by utilizing a hallow cylindrical valve which is selectively and telescopically disposed over an aligned conforming biscuit around which biscuit and through which valve the fluid flows. The valve does not contact the biscuit so that valve chatter is impossible. Furthermore, the absence of a valve seat or other lip reduces the turbulence introduced into fluid flow within the valve body thereby also increasing flow volume capacity. Movement of the valve is controlled in response to pressure within the valve body by means of rolling diaphragm, which is fluidically communicated to the interior of the valve body. The diaphragm, which acts as a piston, is connected between the valve body and the valve member. Increased pressure within the valve acts against the diaphragm forcing the valve member over the biscuit to reduce flow and pressure. The diaphragm, acting as a piston, acts against a prebiased spring. The amount of bias on the spring is adjusted by a collar threadably connected on the exterior of the valve. The collar is manually accessible and adjusted by turning the collar on its threaded connection to the valve body and then compressing or relaxing the compression spring against which the diaphragm acts.

19 Claims, 1 Drawing Sheet

WATER PRESSURE REGULATOR AND METHOD FOR REGULATING PRESSURE THROUGH A VALVE

BACKGROUND

1. Field of the Invention

The invention relates to the field of pressure regulators and in particular to water pressure regulators used in irrigation systems and methods for regulating pressure within such systems.

2. Description of the Prior Arts

In-line water pressure regulators used in irrigation and other applications are well known in the art. An example is shown by Moskow, "Fluid Pressure Regulator," U.S. Pat. No. 3,890,999 (1975) which is an in-line pressure drop regulator with a tubular valve member that is externally adjustable, has a controllable response time, and is balanced so that the pressure effect of the input on a controlled outlet pressure is minimized. The valve has a body with two main parts, an inlet part 10 and an outlet part 12 which are secured together through a lock wire 72 which allows the parts to rotate relative to each other. The valve member 100 shown in the cross sectional view of FIG. 2 is held away from seat 58 by spring 114 with the operating pressure being adjustable by turning knurled edge of collar 120 through access slot 126 compressing the spring to increase the output pressure and expanding the spring to reduce it. Fluid at the output passes through a clearance space between tube 106 and bore 92 to act on piston valve 102 urging the valve closed against the biased force of spring 114. Clearance can be controlled during manufacture to set the operating speed. A tighter clearance provides more damping for the valve. In the diaphragm, the valve member uses an O-ring 112 with a relative large piston 102.

Moskow shows the inlet flow making a right turn in order to flow through the valve instead of having a generally straight flow-through pattern. Furthermore, piston 102 has a fixed effective area upon which the controlling pressure is exerted. Although a small clearance is depicted between outlet port 106 and the body 12 of the valve, it is not clear that this provides the same type of resistance to leakage and hence dampening as the much smaller slip distance. Moskow states at column 3, line 27, that:

"Pressure is able to pass through the clearance space between tube 106 and bore 92. The amount of this clearance determines the speed of response time of the regulator . . . Response sensitivity is adjustable by the amount of clearance between the end of tube 106 and bore 94 as described."

Another example is shown by Rosenberg, "Pressure Regulator," U.S. Pat. No. 4,474,207 (1984) which shows a pressure regulator for irrigation systems that has a low pressure drop, particularly at low input pressures. This feature is the result of the regulator member engaging an inner surface of the housing so as to reduce the effective area of the pressure sensitive area, thereby retaining the regulator in a full open position until the output pressure exceeds a predetermined regulated pressure. Once exceeded, the regulator moves and starts to maintain the predetermined pressure. The underlying embodiment has a housing 2 with a plug 4 holding seat ring 12 as best illustrated in the cross sectional view of FIG. 1. Regulator cylinder 38 is biased up by spring 40 down by the outlet pressure bearing on the outer surface of cylinder 38. At low pressures, cylinder 38 is held against housing 2 so that the surface of cylinder 38 is reduced by the amount at end 42 and full flow is provided with the large opening between lower cylinder end 48 in ring 12. When the pressure exceeds the normal regulating pressure and urges cylinder 38 away from housing 2, then the full surface area of cylinder 38 comes into play and normal pressure regulation takes place.

Rosenberg is thus relevant for showing a spring biased pressure regulator having a similar pressure regulating mechanism as shown in Moskow. However, Rosenberg fails to show a straight flow-through design which would be useful in low pressure applications.

Davis, "Control of Liquid Distribution," U.S. Pat. No. 3,253,608 (1966) shows an in-line axial flow nonrestricted externally adjustable pressure controller having a sleeve valve controlled by a diaphragm. Housing 10 holds a sleeve valve 18 that includes two diaphragms 72 and 74. Air pressure supplied through valve 79 acting as biasing spring on diaphragm 72 to counterbalance the outward pressure that acts on diaphragm 74 in order to set the output pressure. In a no-flow condition, valve sleeve 18 seals against flexible valve seat 82.

Davis is relevant for showing a valve seating in which, when valve seat 18 opens up, the full inner diameter of valve seat 18 is available because of the curved nipple-shape of the seating ports 80. Davis contemplates a substantial turn of flow through channel 60. Davis is also relevant for showing rolling diaphragms for use in a pressure regulating valve.

Rogers, "Axial Flow Pressure Regulator," U.S. Pat. No. 4,561,465 (1985) shows an in-line axial flow, spring biased tubular valve regulator that has damping to prevent hunting. As depicted in FIG. 1, body 10 has a passage 12 with tubular valve 78 biased by spring 74. The output pressure acts on valve 58 because end 60 has a larger diameter than end 64. Therefore, the valve is urged by the output pressure to the right end of figure so that end 64 engages seat 54 and controls the output pressure. To prevent hunting, valve 58 is damped by dashpot. The dashpot includes a chamber 82 formed in the body 10 by cylindrical surface 84 and a valve mounted snap ring 86 mounted adjacent the valve end 64 which radially extends into chamber 82 whereby small clearance is provided between the periphery of ring 86 and surface 84. See specifically the cross sectional view of FIG. 2. This clearance defines a damping orifice, establishing communication between chamber 84 and the internal fluid pressure to dampen the valve movement to produce a smooth valve operation during pressure regulation. See this description beginning at column 4, line 4 through line 17.

While Rogers is relevant for showing fluidic friction used as a damping mechanism to prevent hunting in a flow-through valve, the mechanism by which the fluidic resistance is created in the "dashpot chamber" is structurally distinguishable from a small clearance channel. Although the two mechanisms necessarily use the same physical law, they are different means for using fluidic resistance in pressure regulation. Rogers is further distinguished in that the fluidic resistance is provided as a direct retarding force on the motion of the regulating sleeve valve.

Healy et al., "Pressure Regulator," U.S. Pat. No. 4,543,985 (1985) shows an irrigation sprinkler pressure regulator with an in-line axial construction, having a diaphragm supported, spring biased throttling stem. Pressure regulator 10 in FIG. 1 has an upper casing 11, lower casing 12, with passages 15 and 16 containing throttling stem 20 which is slidably mounted and biased away from seat 32 by spring 21 which rides on an adjusting washer 22. Attached to the throttling stem 20 is an annular diaphragm 27. Hunting is eliminated by pressure controller 41 which is closely fitted to allow a small flow through space 46 to chamber 47. A small flow of the output pressure fluid applies pressure against the top surface 35 of stem 20 and ring 30, thereby damping oscillations. See the description beginning at column 3, line 32 through line 63.

Healy is thus relevant for showing a fluidic resistance passage 46 which is used to apply a pressure against a rolling diaphragm 27 to dampen the movement of a pressure regulating sleeve in a flow-through valve system.

Therefore, what is needed is a water pressure regulator for use in irrigation systems which provides for a straight through high volume flow through the regulator, with quiet operation without chatter or oscillation which is characteristic of the in-line pressure regulators described above. Further, what is needed is a design which is reliable and rugged should be inexpensively manufactured without requiring complex machining, moldings or castings.

BRIEF SUMMARY OF THE INVENTION

The invention is an improvement in a fluidic pressure regulator comprising a body having an in-line flow path defined therethrough for passage of fluid. The flow rate is regulated. The regulator includes a movable valve member. The valve member is tubular. A passage is defined through the valve member for flow of the fluid. The valve member has an end with an inner radial dimension. The valve body has a biscuit connected thereto within the flow of fluid through the valve body. The biscuit has an outer radial dimension. The improvement comprises a valve movement element for telescopically and selectively disposing the end of the valve member over and around the biscuit. The inner radial dimension of the valve member conforms with and is greater in each radial direction than the outer radial dimension of the biscuit over which the movable valve member is selectively disposed. A control element selectively disposes the valve member over the biscuit according to a selectively predetermined degree of pressure regulation of flow the fluid through the valve body. As a result, a straight through, high volume, flow through regulator is provided.

At least a portion of the biscuit is adapted to being juxtaposed to the movable valve member and has a generally circular configuration and a single outer diameter. The end of the movable valve member has a generally circular opening defined therein which communicates with the passage for the fluid therethrough. The circular opening has a single fixed inner diameter. The inner diameter of the valve member freely slides over the outer diameter of the biscuit.

The body is generally cylindrical in configuration and has a longitudinal axis. The flow of fluid of the valve body is straight and is generally directed along the longitudinal axis of the valve body. The biscuit has at least one spider arm, is connected to the valve body and is disposed by the spider arm in the flow of fluid through the valve body.

In the preferred embodiment the biscuit is centrally disposed on the longitudinal axis of the valve body by at least two spider arms.

The biscuit is provided with a facing surface on which flow of fluid within the valve body impinges. The facing surface is contoured to minimize creation of turbulence within the fluid as a result of presence of the biscuit within the flow.

The biscuit is also provided with a trailing surface on a side of the biscuit opposing impingement of fluid flowing through the valve body and impinging upon the biscuit. The trailing surface has a shape which minimizes introduction of turbulent flow and the fluid flows past the biscuit through the valve body.

The movable valve member is a cylindrical tube and the valve movement element for telescopically disposing the movable valve member over the biscuit comprises a diaphragm fluidically communicated with the fluid flow within the body and coupled between the valve member and the valve body. The diaphragm acts as a piston to force the valve member in a predetermined direction within the valve body over the biscuit. The valve member is supported by and longitudinally slidable within the valve body along the longitudinal axis of the valve member. The diaphragm is are fluidically communicated with the flow within the valve body by a fluidic resistance conduit for providing dampening between response of the diaphragm acting as a piston and pressure fluctuations of the fluid within the valve body.

The diaphragm is a flexible rolling diaphragm having a folded contour to provide a sliding surface area of the diaphragm to permit substantially increased longitudinal movement of the movable valve member coupled thereto.

The conduit for providing fluidic communication between the diaphragm and the flow within the valve body comprises a labyrinthine passage there between having a characteristic fluidic resistance tending to impede flow of fluid between the diaphragm and the flow within the valve body.

The valve movement element for telescopically disposing the valve body over the biscuit further comprises a spring for biasing the movable valve member in a first configuration with respect to the biscuit. The first configuration is either an open or closed position of the valve member with respect to the biscuit. The diaphragm selectively disposes the movable valve member in a second configuration opposite of the first configuration. The second configuration is a closed or at least partially closed configuration of the valve member to the biscuit if the first configuration is an open configuration. The second configuration is an open configuration or partially open configuration if the first configuration is a closed configuration of the valve member and biscuit.

In the preferred embodiment the control element comprises adjustment element for prebiasing the spring. The control element comprises an adjustment element for varying the degree of control applied to the valve movement element by the control element according to the magnitude of pressure communicated to the valve movement element from the flow within the valve body. The adjustment element is manually manipulated and accessible outside side valve body to permit arbitrarily variable control of pressure regulation by the valve movement element. The valve movement element comprises a prebiased spring for controlling in part movement of the valve member and wherein the adjustment element varies the amount of bias set into the prebiased spring. The prebiased spring is a compression spring and the adjustment element is a spring stop and a collar coupled to the spring stop beating against the prebiased spring. The collar is threaded to the valve body and bidirectionally movable along the threaded connection to the valve body to selectively compress and relax the prebiased spring.

The invention is also characterized as an improvement in a method for regulating pressure in a fluid flowing through a pressure regulator comprising the steps of: flowing the fluid through a valve body and through a movable valve member slidably disposed in the valve body; and communicating pressure of the fluid flowing within the valve body to a piston element coupled to the valve member to selectively move the valve member from an open to at least a partially closed configuration within the valve body according to pressure of the fluid flowing within the valve body. In the step of at least partially closing the valve member, the improvement comprises the step of selectively moving the valve member telescopically over a biscuit. The valve member has an interior opening defined therein through which the fluid flows and the valve member is moved so that the biscuit is telescopically disposed within the opening without abutment of the valve member against the biscuit or valve seat. As a result, high volume straight through chatter-free flow of the fluid through the pressure regulator is provided.

The improvement further comprising the step of varying the degree of control of the piston on the valve member by manually varying the bias applied to a spring coupled to the piston for moving the valve member. The step of varying is performed through an adjustment element positioned exterior to the valve body. The step of varying the adjustment element exterior to the valve body comprises the step of turning an exterior collar threaded on the valve body coupled to the spring for prebiasing the spring.

The invention may be better visualized by now turning to the following drawings wherein like elements are referenced by like numerals.

The invention and its various embodiments can be better understood by turning to the following detailed description.

DETAILED DESCRIPTION OF THE PREFERRED EMBODIMENTS

An improved high volume, straight through, low turbulent flow pressure regulating valve is provided by utilizing a hallow cylindrical valve which is selectively and telescopically disposed over an aligned conforming biscuit around which biscuit and through which valve the fluid flows. The valve does not contact the biscuit so that valve chatter is impossible. Furthermore, the absence of a valve seat or other lip reduces the turbulence introduced into fluid flow within the valve body thereby also increasing flow volume capacity. Movement of the valve is controlled in response to pressure within the valve body by means of rolling diaphragm, which is fluidically communicated to the interior of the valve body. The diaphragm, which acts as a piston, is connected between the valve body and the valve member. Increased pressure within the valve acts against the diaphragm forcing the valve member over the biscuit to reduce flow and pressure. The diaphragm, acting as a piston, acts against a prebiased spring. The amount of bias on the spring is adjusted by a collar threadably connected on the exterior of the valve. The collar is manually accessible and adjusted by turning the collar on its threaded connection to the valve body and then compressing or relaxing the compression spring against which the diaphragm acts.

The pressure regulator will be used in agricultural applications, and further because it is capable of also high flow and high pressure operation, in golf course, park or other sprinklered applications where higher pressure is required.

Figure 1:
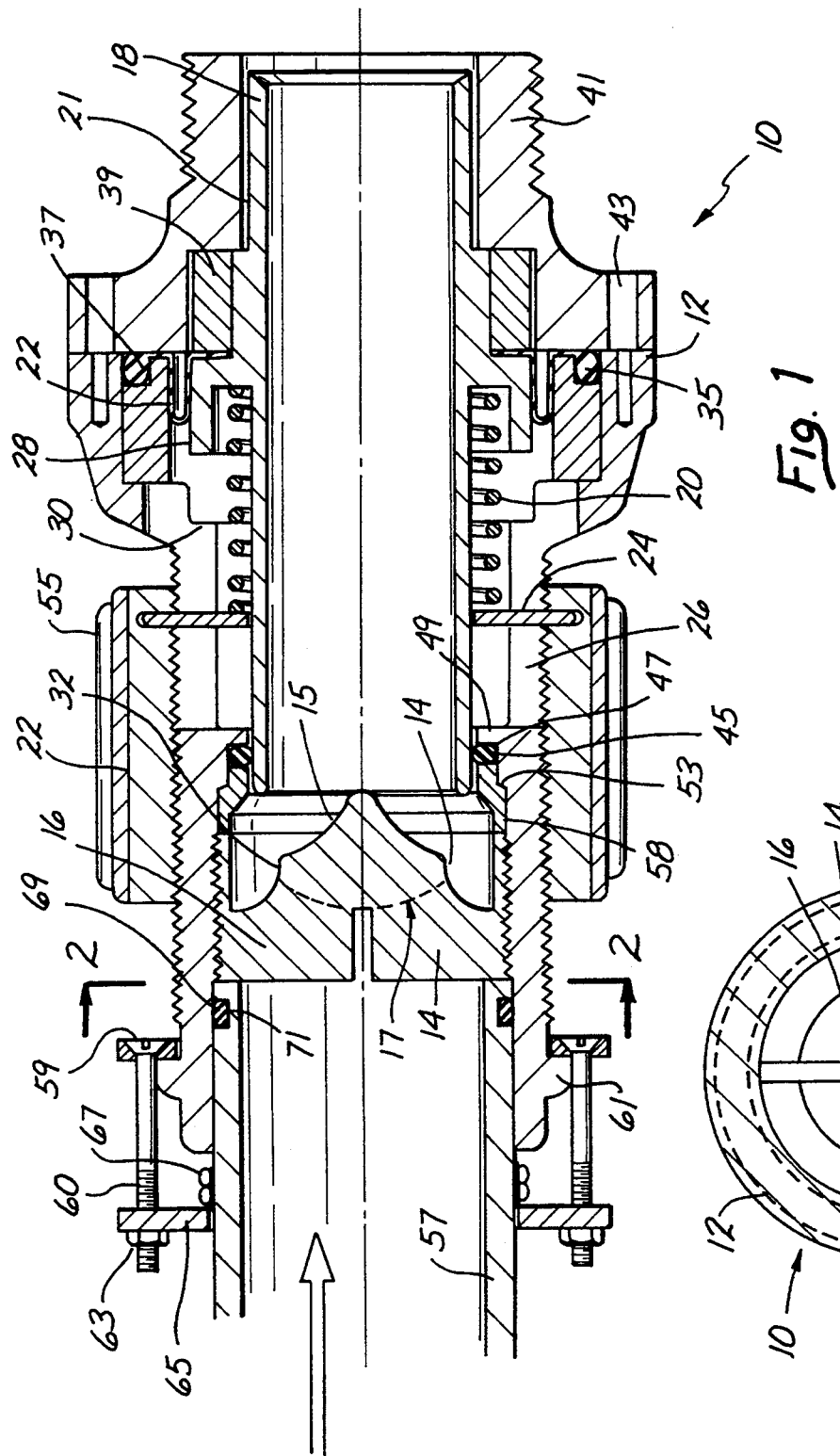
FIG. 1 is a longitudinal cross sectional view of the valve devised according to the invention.
Figure 2:
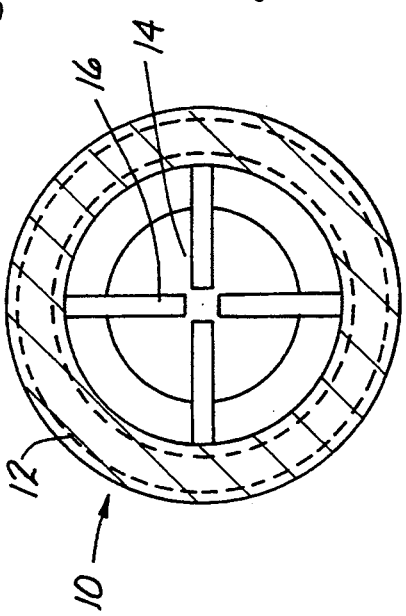
FIG. 2 is a perpendicular cross sectional view taken through line 2—2 of FIG. 1.

As shown in the drawing, the pressure regulator 10 is comprised of a generally cylindrical body 12, having a fixed plug or "biscuit" 14 which is suspended in the center of body 12 by means of a plurality of spider arms 16, which are better depicted in the sectional view of FIG. 2 taken through section lines 2—2 of FIG. 1. Opposing biscuit 14 is a reciprocating generally cylindrical sleeve 18 which is spring-loaded by means of a compression spring 20 to the fully open position to the right in FIG. 1.

Water flowing in the direction of the flow arrow from left to tight in FIG. 1 through pipe 57 eventually builds up a back pressure in the line which is communicated through a fluidic resistance or duct 21 to a rolling diaphragm 22. Pipe 57 is coupled to valve 10 by means of a plurality of tension bolts 60 bearing on one end 59 against integral shoulder 61 of body 12 and on the opposing end 63 against a circular retaining washer 65 abutting pipe shoulder 67. Pipe 57 is sealed to valve 10 by means of an O-ring 69 in O-ring groove 71.

Rolling diaphragm 22 is fixed at its inner diameter between an outer rear shoulder 33 of sleeve 18 and collar 39 circumferentially fixed about sleeve 18. Diaphragm 22 is terminated at its outer diameter to integrally form an O-ring 37 which is seated in an O-ring groove 35. Diaphragm 22 thus seals the end of valve 10 in combination with an end cap 41 which is a affixed to valve body 12 by means of a plurality of screws 43. Diaphragm 22 acts as a rolling piston head against which the back pressure acts to move sleeve 18 to a closed position. This back pressure causes reciprocating sleeve 18 to move to the left in FIG. 1 thereby closing around biscuit 14. Sleeve 18 smoothly telescopes around the shoulder 32 of biscuit 14 without contacting biscuit 14. The downstream or trailing face 15 of biscuit 14 is contoured to reduce turbulence in the water flow past biscuit 14 through valve 10. The upstream face 17 of biscuit 14 is similarly contoured as shown in dotted outline in the cross-sectional view of FIG. 1 to reduce turbulence in the impinging fluid flow through valve 10. The outer diameter of sleeve 18 bears against an O-ring 45 set in O-ring groove 47 to provide a fluid tight seal between sleeve 18 and body 12. In the illustrated embodiment O-ring groove 47 is defined between a lip 49 of body 12 and a retaining ring 58. Retaining ring 51 in turn is held in place against a shoulder 53 in body 12 by spider arms 16 which are threaded into body 12. The clearance between shoulder 32 of biscuit 14 and sleeve 18 when sleeve 18 is moved adjacent thereto is set at or below a predetermined value. This restricts the flow thereby causing the pressure to drop. A balance between flow and pressure is then achieved according to the force provided by the predetermined spring constant 20.

The spring force provided against the backpressure exerted on diaphragm 22 is fine-tuned by adjusting a rotatable collar 55 threaded to the outside of body 12. Collar 55 is on the outermost surface of valve 10 so that it is easily accessible, is provided with a knurled or ridged grasping surface 55, and is easily manually adjusted. Collar 55 is coupled to spring 20 by means of a toothed washer 24 extending through a slot 26 in body 12 and bearing against the left end of spring 20.

The advantage of the pressure regulator of the invention is that it is a straight through, high volume, flow through regulator which operates quietly without chatter or oscillation which is characteristic of prior art pressure regulators. High volume is achieved through the straight flow through design. Other flow through designs exist but they are distinguished in that the end of reciprocating sleeve valve normally abuts the biscuit to form a sealing seat. Direct impulsive contact is common with the result that in some flow circumstances valve chatter arises and in the worst cases causes valve damage or accelerated wear.

In the illustrated disclosure, the inner diameter of sleeve 18 is 1.300 inch while the outer diameter of biscuit 14 is 1.280 inch. Therefore, there is a 0.0020 inch clearance between biscuit 14 and the inner diameter of reciprocating sleeve 18. Therefore, sleeve 18 extends over biscuit 14 without contacting it. The result of this is that when sleeve 18 uncovers biscuit 14, the maximum amount of opening for flow through is created without interference or turbulence from a value seat or other flow direction changes or obstructions in the valve.

In addition valve chatter is eliminated. Leftward movement of sleeve 18 is limited only by means of flange 33 contacting shoulder 39. Should mechanical contact occur, it does not occur at surfaces which are used to restrict fluid flow. These latter restricting surfaces thereby remain immune from physical insult and damage. Further, if a seating shoulder 32 were defined around biscuit 14, the amount of flow through restriction through the valve regulator is then fixed by the outer diameter of biscuit 14 which is greater than the inner diameter of reciprocating sleeve 18. This small difference can, in fact, amount to a large increase of the volume flow through the valve at a given pressure.

A second feature of novelty is the fluidic resistance provided by passage 21 to rolling diaphragm 22 from the downstream sign of the pressure regulator. This resistance provides fluidic dampening which in other pressure regulators is provided through more complex arrangements. Without such dampening, a resonance could be set up within the line which often causes chattering, which in turn can cause regulator damage or, more likely, damage to pipe fittings downstream due to the water hammer created.

A third feature is the ability to provide an exterior fine adjustment to the spring force created by spring 20 in a straight flow through design by turning collar 55 on the threading provided on the outside of housing 12.

A fourth feature is a large diaphragm size used in combination with a straight flow through device for large volume flows. In prior art devices, the diaphragms are proportionately much smaller in comparison to the Inner diameter of sleeve 18. The use of a very large diameter diaphragm as realized in rolling diaphragm 22 has the result of producing acurate response to changes in downstream pressure.

Finally, the straight through flow path which is provided, such as elimination of a seating flange at position 32 and the use of machine tolerances to form a resistance feedback duct 20 results in a high flow, straight through valve which smoothly operates without chatter and which can be manufactured very inexpensively without complex machining. In other words, the effects that are achieved are achieved elegantly in mechanical terms using parts which can be machined or molded very easily and inexpensively. The result is not only a high volume flow regulator cheaper than any now existing in the market but one that is also extremely rugged and reliable.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptionally equivalent, and also what essentially incorporates the germ of the invention.

I claim:

1. An improvement in a fluidic pressure regulator having an output and comprising a valve body having a single in-line flow path defined therethrough for passage of fluid through which all fluid flows, and a movable valve member, said valve member being tubular, and a passage defined through said valve member for flow of said fluid, said valve member having an end with an inner radial dimension, said valve body having a biscuit connected thereto within said flow of fluid through said valve body, said biscuit having an outer radial dimension, said improvement comprising:

valve movement means for telescopically and selectively disposing said end of said valve member over and around said biscuit, said inner radial dimension of said valve member conforming with and being greater in each radial direction than the outer radial dimension of said biscuit over which said movable valve member is selectively disposed to define a minimum predetermined clearance therebetween, so that no contact with said biscuit occurs and so that flow of fluid through said pressure regulator continues although being selectively restricted by said valve member, but never being shut off, said valve movement means communicating only with said in-line flow path downstream from said valve member to respond to pressure at said output of said pressure regulator; and control means for selectively controlling disposition of said valve member over said biscuit in response to a selected degree of pressure regulation desired for fluid flowing through said valve body, whereby a straight through, high volume, flow through regulator is provided.

2. The improvement of claim 1 wherein at least a portion of said biscuit juxtaposed to said movable valve member has a generally circular configuration and a single outer diameter, and where said end of said movable valve member has a generally circular opening defined therein communicating with said passage for said fluid therethrough, said circular opening having a single fixed inner diameter, said inner diameter of said valve member freely sliding over said outer diameter of said biscuit.

3. The improvement of claim 1 wherein said body is generally cylindrical in configuration and has a longitudinal axis, wherein said flow of fluid of said valve body is straight and is generally directed along the longitudinal axis of said valve body, wherein said biscuit has at least one spider arm and wherein said biscuit is connected to said valve body and disposed by said spider arm in said flow of fluid through said valve body.

4. The improvement of claim 2 wherein said body is generally cylindrical in configuration and has a longitudinal axis, wherein said flow of fluid of said valve body is straight and is generally directed along the longitudinal axis of said valve body, wherein said biscuit has at least one spider arm and wherein said biscuit is connected to said valve body and disposed by said spider arm in said flow of fluid through said valve body.

5. The improvement of claim 4 wherein said biscuit is centrally disposed on the longitudinal axis of said valve body by at least two spider arms.

6. The improvement of claim 1 wherein said biscuit is provided with a facing surface on which flow of fluid within said valve body impinges, said facing surface being contoured to minimize creation of turbulence within said fluid as a result of presence of said biscuit within said flow.

7. The improvement of claim 1 wherein said biscuit is provided with a trailing surface on a side of said biscuit opposing impingement of fluid flowing through said valve body and impinging upon said biscuit, said trailing surface having a shape to minimize introduction of turbulent flow and said fluid flows past said biscuit through said valve body.

8. The improvement of claim 6 wherein said biscuit is provided with a trailing surface on a side of said biscuit opposing impingement of fluid flowing through said valve body and impinging upon said biscuit, said trailing surface having a shape to minimize introduction of turbulent flow and said fluid flows past said biscuit through said valve body.

9. An improvement in a fluidic pressure regulator comprising a body having an in-line flow path defined therethrough for passage of fluid, and a movable valve member, said valve member being tubular, and a passage defined through said valve member for flow of said fluid, said valve member having an end with an inner radial dimension, said valve body having a biscuit connected thereto within said flow of fluid through said valve body, said biscuit having an outer radial dimension, said improvement comprising:

valve movement means for telescopically and selectively disclosing said end of said valve member over and around said biscuit, said inner radial dimension of said valve member conforming with and being greater in each radial direction than the outer radial dimension Of said biscuit over which said movable valve member is selectively disposed, wherein at least a portion of said biscuit juxtaposed to said movable valve member has an outer diameter, and where said end of said movable valve member has an opening defined therein communicating with said passage for said fluid therethrough, said opening having a fixed inner diameter, said inner diameter of said valve member freely sliding over said outer diameter of said biscuit; and control means for selectively disposing said valve member over said biscuit according to a selectively predetermined degree of pressure regulation of fluid flowing through said valve body, wherein said movable valve member is a cylindrical tube and wherein said valve movement means for telescopically disposing said movable valve member over said biscuit comprises a diaphragm fluidically communicated with said fluid flow within said body and coupled between said valve member and said valve body, said diaphragm acting as a piston to force said valve member in a predetermined direction within said valve body over said biscuit, said valve member being supported by and longitudinally slidable within said valve body along said longitudinal axis of said valve member, said diaphragm being fluidically communicated with said flow within said valve body by a fluidic resistance means for providing dampening between response of said diaphragm acting as a piston and pressure fluctuations of said fluid within said valve body, whereby a straight through, high volume, flow through regulator is provided.

10. The improvement of claim 9 wherein said diaphragm is a flexible rolling diaphragm having a folded contour to provide a sliding surface area of said diaphragm to permit substantially increased longitudinal movement of said movable valve member coupled thereto.

11. The improvement of claim 10 wherein said fluidic resistance means for providing fluidic communication between said diaphragm and said flow within said valve body comprises a labyrinthine passage there between having a characteristic fluidic resistance tending to impede flow of fluid between said diaphragm and said flow within said valve body.

12. The improvement of claim 9 where said valve movement which telescopically disposes said valve body over said biscuit to open or close said valve further comprises a spring for biasing said movable valve member in a first configuration with respect to said biscuit, which can be either an open or closed position, said diaphragm selectively moves said movable valve member to a second configuration which is opposite of said first configuration in the sense that if said movable valve member is biased open, said diaphragm moves said movable valve member closed and vica versa.

13. The improvement of claim 12 wherein said control means comprises adjustment means for prebiasing said spring.

14. An improvement in a fluidic pressure regulator comprising a body having an in-line flow path defined therethrough for passage of fluid, and a movable valve member, said valve member being tubular, and a passage defined through said valve member for flow of said fluid, said valve member having an end with an inner radial dimension, said valve body having a biscuit connected thereto within said flow of fluid through said valve body, said biscuit having an outer radial dimension, said improvement comprising:

valve movement means for telescopically and selectively disposing said end of said valve member over and around said biscuit, said inner radial dimension of said valve member conforming with and being greater in each radial direction than the outer radial dimension of said biscuit over which said movable valve member is selectively disposed; and control means for selectively disposing said valve member over said biscuit according to a selectively predetermined degree of pressure regulation of fluid flowing through said valve body, wherein said control means comprises adjustment means for varying the degree of control applied to said valve movement means by said control means according to the magnitude of pressure communicated to said valve movement means from said flow within said valve body; and wherein said adjustment means is manually manipulated and accessible outside side valve body to permit arbitrarily variable control of pressure regulation by said valve movement means, whereby a straight through, high volume, flow through regulator is provided.

15. The improvement of claim 14 wherein said valve movement means comprises a prebiased spring for controlling in part movement of said valve member and wherein said adjustment means varies the amount of bias set into said prebiased spring.

16. Improvement of claim 15 wherein said prebiased spring is a compression spring and said adjustment means is a spring stop and a collar coupled to said spring stop bearing against said prebiased spring, said collar being threaded to said valve body and bidirectionally movable along said threaded connection to said valve body to selectively compress and relax said prebiased spring.

17. An improvement in a method for regulating pressure in a fluid flowing through a pressure regulator comprising the steps of flowing the fluid through a valve body and through a movable valve member slidably disposed in said valve body; and communicating pressure of said fluid flowing within said valve body to a piston means coupled to and located downstream from said valve member to selectively move said valve member from an open to a partially closed configuration within said valve body according to pressure of said fluid flowing within said valve body, said improvement comprising the steps of:

in said step of at least partially closing said valve member, selectively moving said valve member telescopically over a biscuit, said valve member having an interior opening defined therein through which said fluid flows and said valve member being moved so that said biscuit is telescopically disposed within said opening without abutment of said valve member against the biscuit, whereby high volume straight through chatter-free flow of said fluid through said pressure regulator is provided.

18. The improvement of claim 17 further comprising the step of varying the degree of control of said piston on said valve member by manually varying the bias applied to a spring coupled to said piston for moving said valve member, said step of varying being performed through an adjustment means positioned exterior to said valve body.

19. The improvement of claim 18 where said step of varying said adjustment means exterior to said valve body comprises the step of turning an exterior collar threaded on said valve body coupled to said spring for prebiasing said spring.

* * * * *